Figure 9:
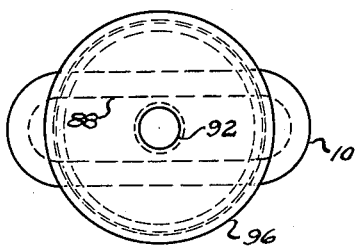

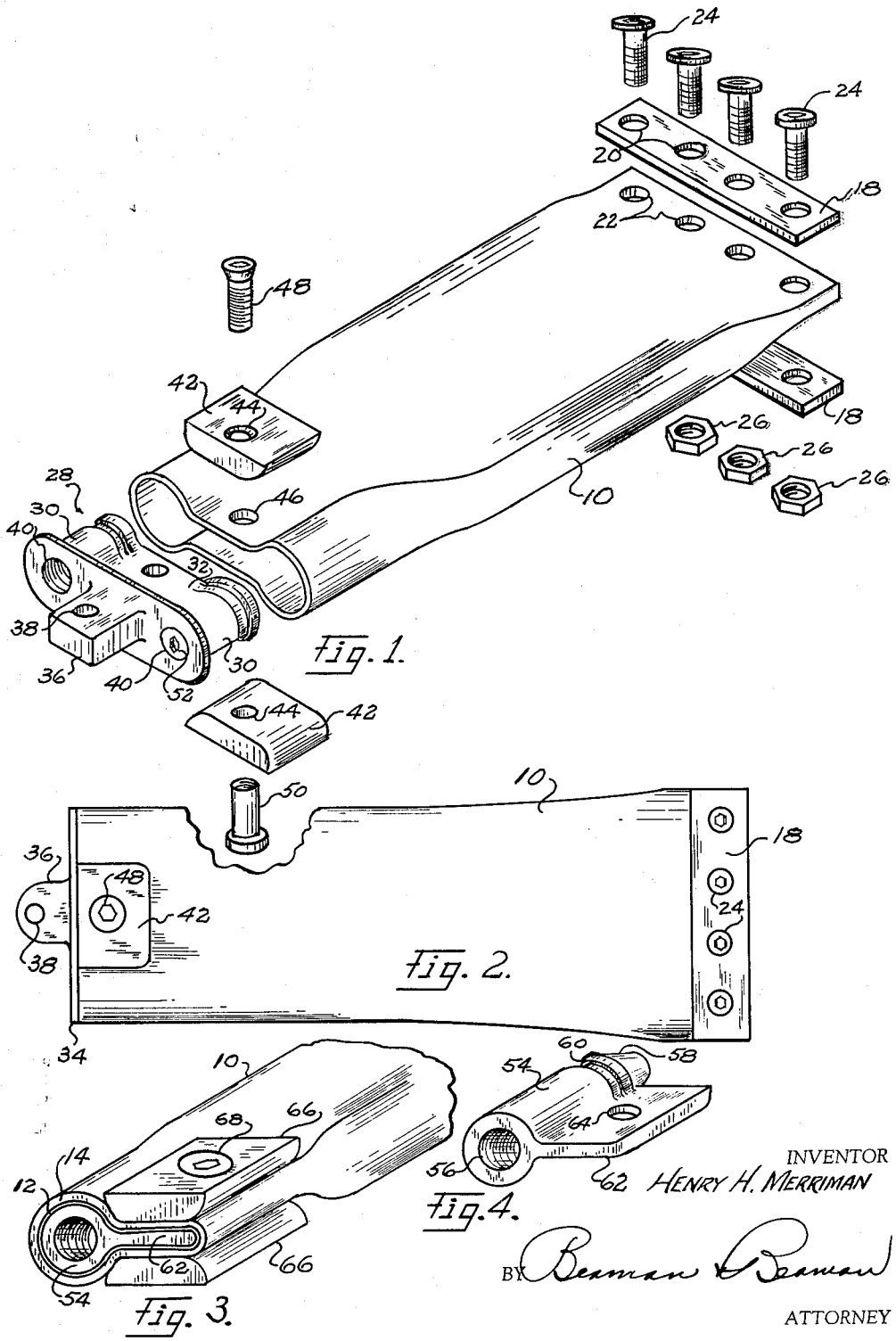

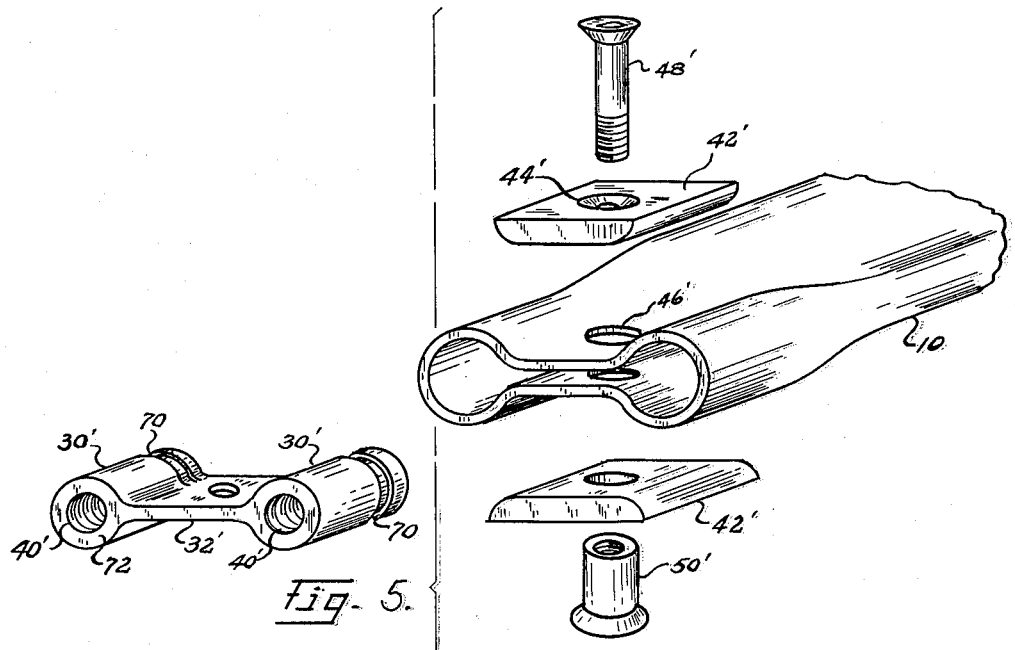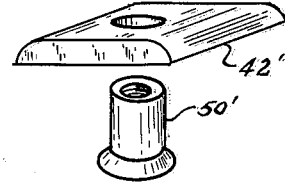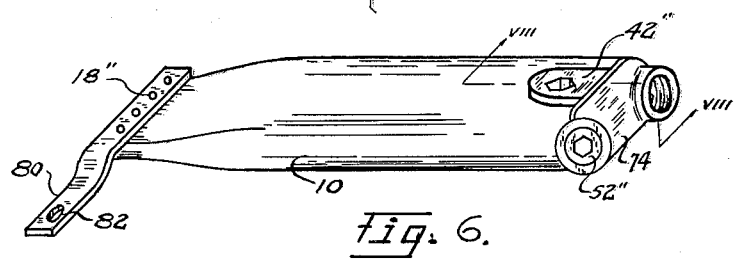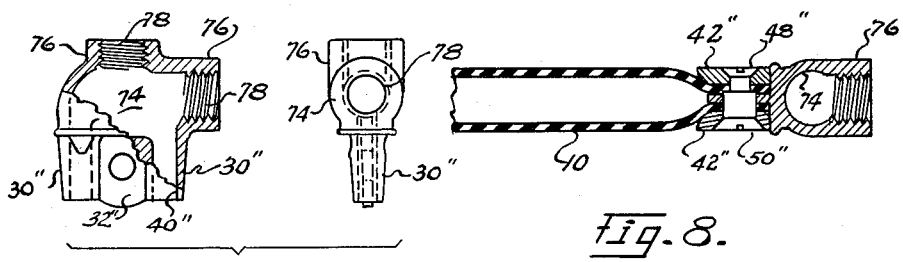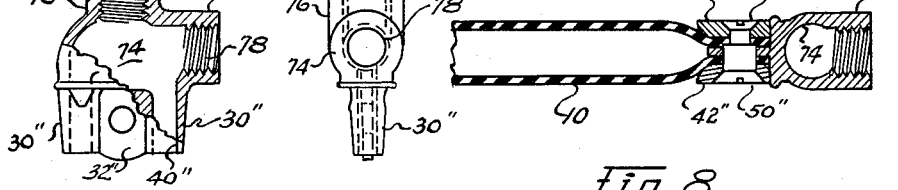
INVENTOR
HENRY H. MERRIMAN
ATTORNEY April 9, 1963 H. H. MERRIMAN 3,084,961
COUPLING FOR TUBE EXPANDER
Filed Oct. 31, 1958 5 Sheets-Sheet 4
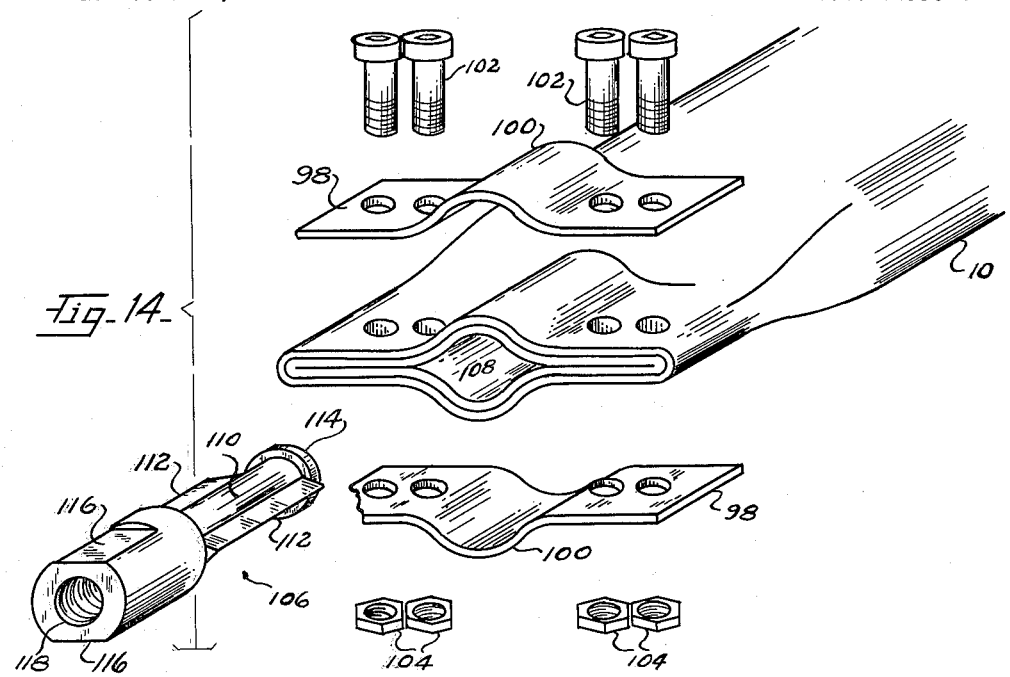
Fig. 14.
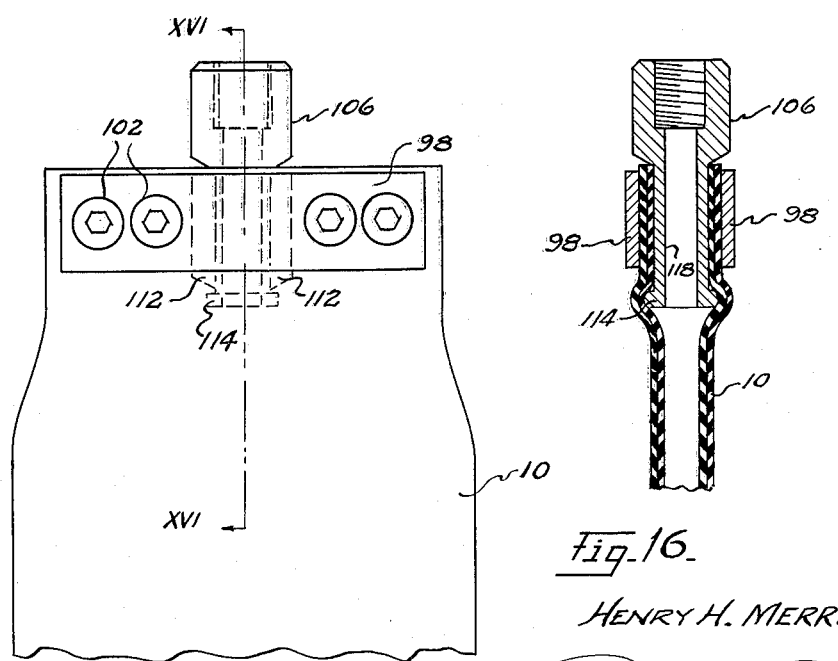
Fig. 15.
Fig. 16.
INVENTOR
HENRY H. MERRIMAN
BY Beaman & Beaman
ATTORNEY

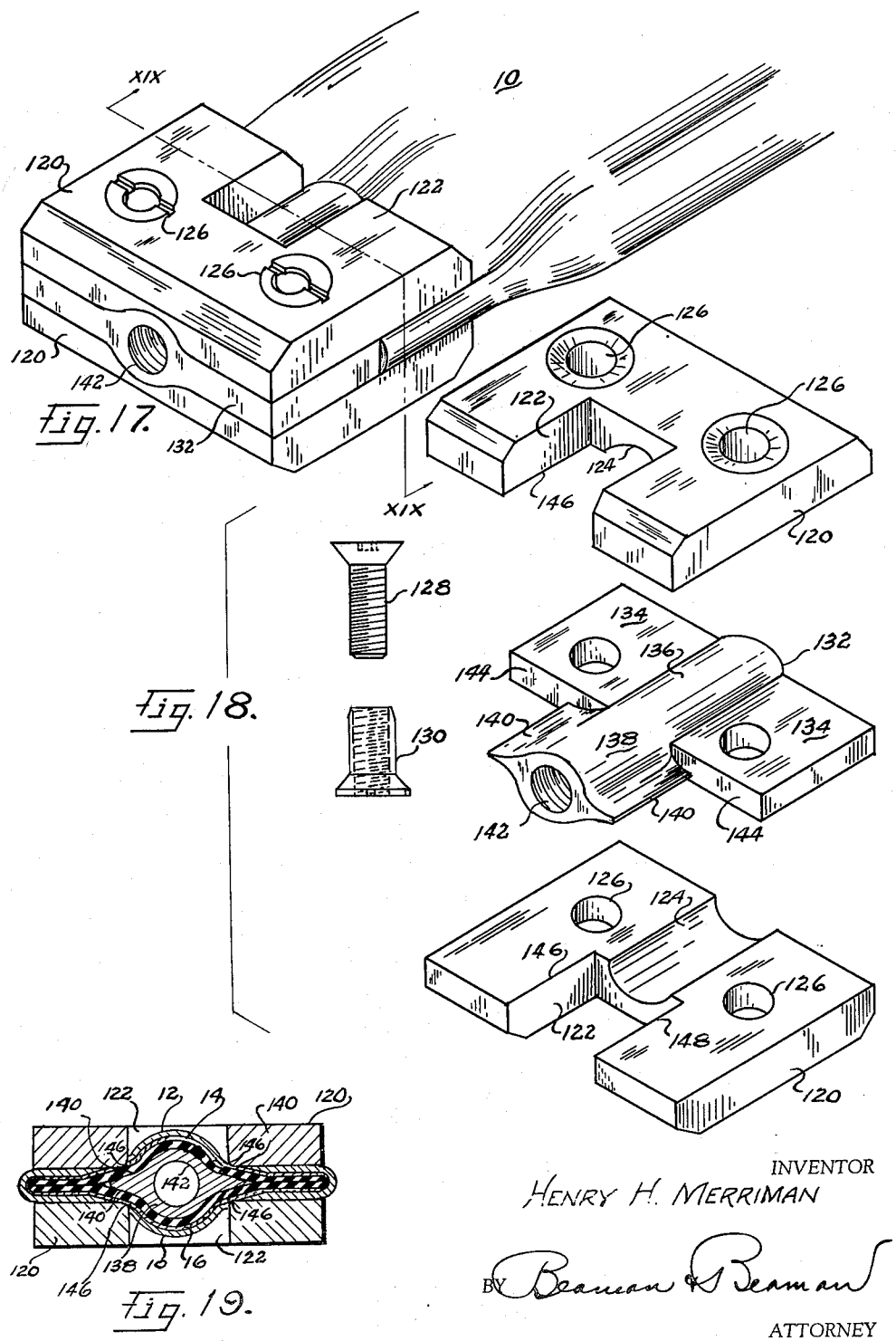

United States Patent Office 3,084,961
Patented Apr. 9, 1963

3,084,961
COUPLING FOR TUBE EXPANDER
Henry H. Merriman, 751 W. Washington St.,
Jackson, Mich.
Filed Oct. 31, 1958, Ser. No. 771,078
6 Claims. (Cl. 285—242)

The present invention relates to improvements in fluid actuators fabricated from a length of tubular flexible hose and particularly relates to coupling structure for closing one or both ends of the hose with a fluid coupling. The present invention is a continuation-in-part of my co-pending application No. 661,506, filed May 24, 1957, now Patent No. 2,976,888.

Basically the fluid actuator of the invention consists of a flexible hose-like member which is capable of transverse contraction and expansion under influence of the internal pressure within the hose. Preferably, the actuator is formed of a relatively thin walled hose construction having an extruded elastomer inner liner reinforced by an outer covering of fabric to render the hose relatively non-stretchable.

It is desired that the hose employed by the actuator of the invention be characterized by its tendency to collapse into a flattened form which may be coiled upon itself, such as fire hose, and it may be desired to cure the inner liner of the hose in the shape of a flattened tube whereby the hose of the actuator has an inherent tendency, other than gravity alone, to assume a flattened form. To permit maximum "flattening" of the hose it is contemplated that the inner liner and outer fabric not be bonded together thereby reducing a tendency of the hose to maintain a circular shape due to the resilient character and bulk of the hose material.

In using a section of hose as a fluid actuator whereby the collapsing and restoring of the hose from a relatively flattened cross section to a substantially circular cross section is employed as the working movement the operating area, e.g. the internal area of the hose wherein the force exerted on the hose by the fluid within the hose has vectors in the direction of the usable force, becomes very important as the capacity of the actuator is dependent on the fluid pressure and the active hose area. As the hose size increases end fittings of conventional construction are not practical or desirable due to their shape and configuration. Hose fittings of conventional construction are circular in configuration and as the shape of the fluid actuator in accordance with the invention is of a flattened nature the displacement of the actuator of the invention into a circular shape, as would be the case adjacent the hose ends if conventional couplings are used, is undesirable.

According to the invention the objections produced by conventional couplings when employed with fluid actuators of the above type are overcome by providing an end fitting or coupling which is complementary in shape to the cross section of the actuator in the relaxed or flattened form of the hose. It is thus necessary to conform the coupling to the shape assumed by the hose whereby the flattened hose condition will be aided, and in cases where the stiffness of the hose prevents complete collapse of the hose the coupling will provide means for encouraging the desired form. In one form of the invention sealing of the coupling to the hose is achieved by a wrapping effect whereby the inner liner of the hose is forced to tightly conform to the coupling configuration and in another form the union between hose and coupling is achieved by a compression of the hose between clamping members acting on the outer surface of the hose. In all the forms of the invention it is important that the coupling means does not injure the hose as the fluid actuator will be subjected to hundreds of thousands of cycles of flexing and the coupling member must provide sealing without producing stress points which would rapidly fatigue.

It is thus an object of the invention to provide a fluid actuator formed from a section of hose capable of flexing from a flattened to a non-flattened form and provide an end fitting or coupling which is complementary in shape to the flattened cross section of the actuator.

A further object of the invention is to provide a coupling for a flexible hose which has a hose engaging portion which is non-circular and is of an elongated form.

Another object of the invention is to provide a coupling for flexible hose having a nipple portion which is complementary in shape to the configuration of the hose when in a collapsed or flattened form.

Another object of the invention is to provide an end fitting for a flexible hose wherein passage means are provided in the fitting whereby fluid pressure may be introduced into the hose.

A further object of the invention is to provide an end fitting having a nipple of elongated transverse cross section which closely fits within the bore of a flattened hose and is provided with passage means having access to the hose interior and which is sealingly maintained in engagement with the hose by opposed clamping members acting on opposite sides of the hose forcing the hose in engagement with the nipple of the fitting.

Yet another object of the invention is to provide an end fitting for a hose of the type described wherein parallel passages are provided into the hose interior and fluid communication means are provided with said passages which provide a choice of relationship of the pressure source conduit with the hose and passages.

A further object of the invention is to provide an end fitting for use with a flexible hose of the type described wherein means for mounting and supporting the hose are provided on the fitting and external clamping structure is provided for sealing the hose with the fitting.

Figure 10:
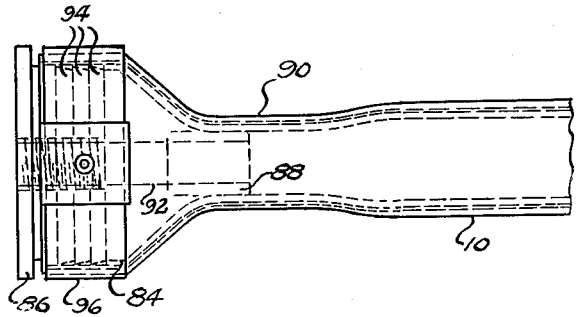
Figure 11:
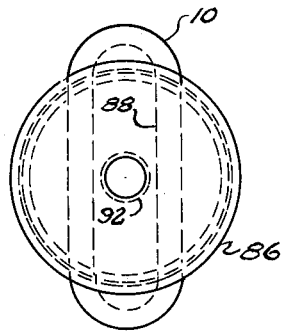
Figure 12:
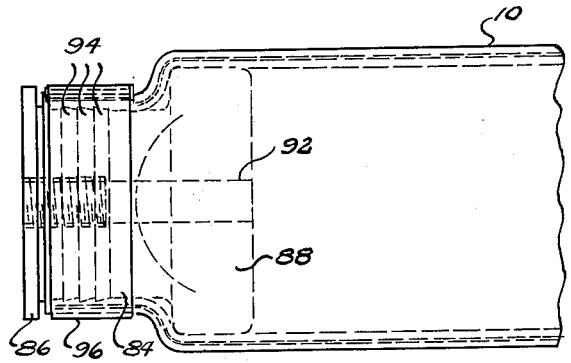
Figure 13:
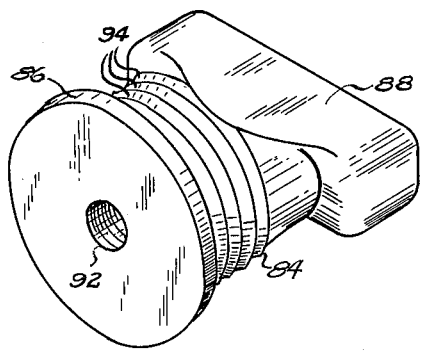

These and other objects of the invention residing in the particular construction and relationship of the components will be more fully apparent when viewed with regard to the following description and accompanying drawings wherein:

FIG. 1 is a perspective exploded view of the fluid actuator and coupling structure of one embodiment of the invention, FIG. 2 is a plan view of the embodiment of FIG. 1 when assembled, FIG. 3 is another embodiment of an end fitting in accord with the invention as assembled to a hose fluid actuator, FIG. 4 is a detail perspective of the fitting of FIG. 3, FIG. 5 is a perspective exploded view of another coupling or end fitting embodiment in accord with the invention, FIG. 6 is a perspective assembled view of yet another coupling embodiment wherein two access means to the coupling are provided which are disposed at right angles to each other, FIGS. 7 and 8 are detail sectional and elevational views of the coupling of FIG. 6, FIG. 8 being taken along VIII—VIII of FIG. 6, FIGS. 9 and 10 are end and side views, respectively, of another embodiment of a coupling in accord with the invention, FIGS. 11 and 12 are end and side views of the coupling of FIGS. 9 and 10 upon rotating the assembled coupling and hose 90°, FIG. 13 is a perspective detail view of the coupling of FIGS. 9–12, FIG. 14 is an exploded perspective view of yet another embodiment of the invention wherein a nipple member having a peripheral surface less than the inner peripheral surface of the hose is employed, FIGS. 15 and 16 are elevational and sectional views, respectively, of the embodiment of FIG. 14 as assembled, FIG. 17 is a perspective view of another embodiment of the invention using a nipple structure similar to that of FIGS. 14–16, FIG. 18 is a perspective exploded view of the coupling of FIG. 17, and FIG. 19 is a sectional view of the embodiment of FIG. 17 taken along the line XIX—XIX.

The hose constituting the fluid actuator in accordance with the invention may take several forms, any of which may be conventional. The requirements of the hose utilized with the invention are that the hose must be relatively flexible such that it may flex from a flattened cross section to an elliptical or substantially circular cross section many times without wear or fatigue, that the hose be able to withstand standard internal pressures of 80 to 150 p.s.i. for instance, however, lower pressures may be used for some applications, and that the hose is resistant to stretching as in most applications stretching of the hose would require means to limit expansion thereof. As mentioned above, a hose design which is preferred consists of an inner elastomer lining cured to a flattened tubular configuration covered by a wrapped fabric reinforcing layer. Such a hose is shown in FIGS. 3 and 16 wherein the hose 10 consists of an inner liner 12 reinforced by a covering of stretch resistant fabric 14. A high pressure hose suitable for use in accordance with the invention is shown in FIG. 19 wherein the hose 10 consists of an inner liner 12 of elastomer material reinforced by a fabric covering 14 which is in turn covered by another layer 16 of elastomer material. The above hose descriptions are by way of example only and the hose itself forms no part of the invention.

Basically the fluid actuator of the invention comprises a flexible portion consisting of the hose element and end fittings adapted to seal the cut ends of the hose. As it is necessary to introduce fluid pressure into the hose member at least one of the end fittings is provided with passage means for this purpose and both of the end fittings are of such configuration to aid the hose in assuming a flattened cross section.

Means for accomplishing these purposes are shown in FIGS. 1 and 2 wherein the hose 10 may be completely closed and flattened at one end by using a pair of clamping plates 18 which are of a length at least equal to the width of the flattened hose. The plates 18 are provided with holes 20 and holes 22 are formed in the hose in alignment with the plate holes. Thus, by sandwiching the end of the hose 10 between plates 18 and drawing the plates toward each other by bolts 24 cooperating with nuts 26 the hose end may be effectively sealed off due to pinching together the inner liner 12.

The other end of the hose 10 is sealed by a coupling member 28 of substantially elongated configuration. The coupling 28 consists of two cylindrical nipple portions 30 connected by a planar web 32, the diameter of the portions 30 being small with respect to the diameter of the hose 10 such that a substantially elongated form is provided by the nipple. A flange 34 is formed integral on the coupling and projects from the periphery of the cylindrical portions a distance substantially equal to the wall thickness of the hose 10 whereby upon insertion of the nipple into the hose the end of the hose will abut the flange 34. A projection 36 is also formed as part of the coupling 28 and extends axially of the coupling away from the hose; as shown, the projection is centrally disposed between the cylindrical portions 30 and is provided with a hole 38. The cylindrical portions 30 are axially drilled as at 40 and these bores extend through the coupling and are threaded adjacent the flange end such that a source of fluid pressure may be affixed in communication with the bores and the hose inflated and deflated as desired. A pair of clamping plates 42 are employed to provide the means for clamping the hose to conform to the nipple configuration. These plates 42 are radiused longitudinally and transversely to prevent damage to the hose or fabric covering and are of a transverse width less than the width of the web 32. The plates 42 are formed with holes 44 and the hose 10 is drilled at 46 whereby upon insertion of the nipple portion of the coupling into the hose the screw 48 cooperating with the nut 50 will draw the clamping plates 42 and the opposite sides of the hose toward each other. This action forces the hose to assume a figure 8 shape corresponding to the configuration of the nipple portion. The plates, in forcing the hose material against both sides of the web 32, tightly draw the hose into engagement with the cylindrical nipple portions 30 and the desired result of providing intimate sealing contact of the hose with the coupling is achieved. It will be understood that the dimensions of the nipple portion are related to the inner dimension of the hose such that sealing contact of the hose to the coupling is provided without unduly stressing the hose or without wrinkles or bulges being formed at the nipple region.

In FIG. 1 the right bore 40 has been plugged by a screw 52 and in instances where sufficient fluid, usually compressed air, can be introduced into the hose by a single passageway 40 the screw 52 will be used. Where the hose is of large diameter or of great length or the application requires very fast response the screw 52 is removed and fluid pressure may be introduced into the hose through both passages 40. The projection 36 may be used to mount the fluid actuator assembly where other means for maintaining the actuator in the desired position are not employed.

Another type of coupling for closing the hose end and providing access to the hose interior is shown in FIGS. 3 and 4. This embodiment comprises a coupling which is entirely inserted into the hose liner and includes a cylindrical nipple portion 54 which is provided with an axial bore 56 which is threaded adjacent the outer end. The portion 54 may be tapered at the inner end 58 if desired and formed with a groove 60 into which a sealing ring may be placed. A wing 62 of planar shape extends transversely from the cylindrical nipple portion 54 and is provided with a bolt hole 64. Thus, upon inserting the coupling into the end of the hose clamping plates 66 may be utilized to draw portions of the hose into tight engagement with the wing 62 through operation of bolt 68, which will tightly wrap the hose about the cylindrical portion 54 sealing the hose to the coupling. This is an inexpensive coupling which is best used with small size hose yet provides a simple and efficient means for closing the hose end.

The coupling embodiment of FIG. 5 is similar to that of FIG. 1 and like primed numerals are used to designate similar components and elements. The cylindrical portions 30' of this coupling are provided with grooves 70 to receive a sealing ring, if desired, similar grooves may be employed by the coupling of FIG. 1 and such use of a sealing ring may be helpful in insuring proper sealing contact between the hose and coupling. The coupling 28' is not formed with a flange or mounting projecting and usually the coupling is inserted into the hose until the end 72 is substantially flush with the hose end. This embodiment is very compact and yet provides two passageways for fluid into the hose interior.

FIGS. 6–8 illustrate yet another embodiment of a coupling which may be used with the invention wherein the connection of the coupling with the conduit supplying the pressurized fluid need not be parallel to the hose axis and the coupling construction permits supply conduits of large size to be employed with fluid actuators of relative small dimension. As various elements of the coupling of FIGS. 6–8 are similar and function exactly as like elements of the coupling of FIG. 1 these elements are indicated by double primes and explanation as to their use and function has heretofore been presented. The coupling of FIGS. 6–8 is provided with a nipple portion 30″, web 32″ and clamping plates 42″ which function with screw 48″ and nut 50″ to seal the coupling with respect to the hose 10. The bores 40″ communicate with a manifold chamber 74 which is formed integral with the coupling and constitutes an enlarged chamber with respect to the dimensions of the nipple portion of the coupling. The chamber 74 is provided with a pair of bosses 76 axially disposed at right angles to each other which are drilled and threaded to receive the fluid pressure supply conduit. Usually one of the ports 78 will be plugged by a screw or threaded plug similar to 52 as the primary purpose of angularly disposing the ports with respect to each other is to provide versatility in the plumbing connections. This construction permits a much larger supply conduit to communicate with the passages in the nipple portion than the embodiments of previously described couplings and hence is of advantage with actuators of considerable length and volume.

An embodiment of a mounting means which may be used with any of the couplings of the invention is also shown in FIG. 6. As illustrated one of the plates 18″ is provided with an off-set extension 80 formed with a hole 82. Thus the extension 80 may be used to position or mount the actuator in a manner similar to that of projection 36.

FIGS. 9–13 disclose a coupling of another form which is of simple configuration and which may be sealed with respect to the hose with very high efficiency. FIG. 13 best illustrates the form of this embodiment wherein the coupling includes a cylindrical neck 84 formed with a flange 86 extending therefrom at right angles. The neck portion 84 extends approximately two-thirds of the axial length of the coupling and tapers into an elongated rectangular portion 88 which transversely is of a greater dimension than the diameter of the neck 84. As it is the purpose of the portion 88 to shape the hose to a flattened condition the periphery of the portion 88 is substantially equal in length to the periphery of the neck 84 and the length of the inner periphery of the hose, thus when the coupling is inserted into the hose as in FIGS. 10 and 12 such that although the portion of the hose overlapping the neck 84 will be of cylindrical cross section the elongated portion 88 flattens the hose as at 90 producing the desired form. The coupling of FIG. 13 is provided with an axial bore 92 and threaded at the outer end to receive the fluid pressure supply conduit as described above. To aid in preventing disassembly of the coupling and hose the surface of neck 84 is preferably provided with annular grooves or serrations 94 of a barbed nature, e.g. the serrations constitute conical surfaces converging toward the portion 88 such that the hose may be easily pushed over the serrations but the serrations bite into the hose upon an attempt to remove the coupling from the hose. Sealing and the union between hose and coupling is further enhanced by the use of a conventional clamp band 96 to press the hose onto the neck surface and the serrations.

FIGS. 14, 15 and 16 disclose another embodiment of coupling contemplated for use with the fluid actuator of the invention. This embodiment distinguishes over prior couplings in that a portion of the hose end employing the coupling is closed by pinching opposing portions of the hose liner against each other rather than compressing the hose liner solely to the coupling nipple portion. This embodiment utilizes a pair of clamping plates 98 formed with a convex central portion 100 which are related as shown in FIG. 14 and bolted together, through holes in the hose, by fasteners 102 and nuts 104. Prior to affixing the plates 98 in position a nipple 106 is inserted within the hose 10 co-axial thereto and is "squeezed" between the portions 100 of the plates 98. As represented in FIG. 14 the clamping plates 98 will produce an elongated opening 108 having a pair of opposed sharp edges. The nipple 106 is provided with a complemental configuration having generally a cylindrical surface at 110 which diverges outwardly to form a pair of sharp edged wings 112. The inner end of the nipple is formed with an enlarged circular flange 114 which acts to bulge the hose outwardly, note FIG. 16, preventing the nipple from being pulled from the hose when assembled. The outer portion of the nipple 106 is of cylindrical form and is provided with an enlarged head having wrench engaging flats 116. An axial bore 118 is formed in the nipple and provided with a threaded portion for attachment of the supply conduit.

After insertion of the nipple 106 into the hose and the clamping of plates 98 by fasteners 102 the assembly appears as in FIGS. 15 and 16. Note that the length of the surface 110 is greater than the width of the plates 98 such that the flange 114 prevents the nipple from being removed from the hose and that by shaping the nipple complementary to the hose opening formed by the clamping plates a good seal is obtainable.

FIGS. 17–19 illustrate another embodiment of coupling structure which employs some of the principles of the embodiment of FIGS. 14–16 but is especially suitable for high pressure actuators wherein the pressure acting on the coupling is unusually high and extra strength and safety factors are desired. The clamping plates of this embodiment are represented at 120 and are U shaped being provided with a recess 122 intersecting one of the sides of plates. The plates 120 are further provided with a cylindrical recess 124 intersecting the recess 122 and a pair of holes 126 adapted to receive the screws 128 and the nuts 130. The coupling also includes an intermediate section 132 adapted to be clamped between the plates 120 and is formed with planar protrusions 134 having holes to provide clearance for screws 128 for this purpose. The central portion 136 of the member 132 is of cylindrical shape and extends into the cylindrical nipple portion 138. The nipple is provided with wings 140, as will be observed, and a bore 142 is axially formed in portion 136 and the nipple to provide a passageway for the supply fluid.

In assembling the coupling to the hose the nipple portion 138 is inserted into the hose until the edge 144 of the protrusions 134 abuts the end of the hose. The clamping plates 120 are then placed on opposite sides of the hose such that the recesses 124 align with the cylindrical portion 136 and the recesses 122 open toward the hose. The screws 128 may then be inserted in the holes and the plates drawn toward each other. When assembled in this manner the recesses 122 partially embrace the nipple portion 138 and the recesses are of such width that the edges 146 thereof tend to tightly press the hose material against the wings 140, note FIG. 19. It will also be observed that the action of plates 120 seals, by pinching, that portion of the liner 12 which is not pressed against the nipple portion. Thus an effective coupling is provided which is of relatively flat configuration maintaining the hose in a flattened condition and will withstand high fluid pressures within the hose.

It will thus be apparent that the invention contemplates several types of couplings or end fittings for use with fluid actuators of the described type. Preferably the components described are formed of metal such as brass, steel, aluminum, etc., however, other rigid, machinable material can be utilized. It is also contemplated that a bonding cement of conventional composition may be used between the nipple portions of the couplings and the hose to increase the sealing therebetween and any good bonding material for rubber and metals is usable. Where clamping plates and other elements contact the outer surface of the hose it is advisable that the edges of these components be radiused to minimize wearing of the hose during flexing and it is to be understood that such construction is employed with the described couplings where appropriate.

I claim:

1. An end fitting for flexible hose having a bore characterized by its ability to be employed with a hose of flattened unpressurized form having longitudinal edges and to maintain the ends of the hose in a flattened form wherein the opposed inner surfaces of the bore adjacent the longtiudinal hose edges are in sealing engagement, a nipple defined on said end fitting received within the bore of the hose, said nipple being of a generally flattened configuration having a longitudinally extending central region defining the maximum nipple thickness in the direction perpendicular to the flattened configuration of the nipple and transversely extending side portions projecting in opposite directions from said central region having a longitudinally extending nipple edge abruptly defined thereon, each of said side portions defined by a pair of tapered surfaces converging toward the adjacent nipple edge defining a minimum nipple thickness at the longitudinal edges of said nipple, an axial bore defined in said nipple and extending therethrough, the distance between said nipple edges being less than the distance between the hose bore longitudinal edges, opposed clamping plates disposed on opposite sides of said nipple each having a central portion overlying the longitudinal nipple edges and lateral portions substantially overlying the hose longitudinal edges, and means drawing said clamping plates toward each other thereby clamping the hose between said plates upon said nipple and the opposed inner surfaces of the hose bore adjacent the hose longitudinal edges into sealing engagement with each other.

2. In an end fitting as in claim 1 wherein clamping edges are defined upon said clamping plates overlying each of the surfaces of said nipple side portions whereby said last mentioned edges engage the outer surface of the hose adjacent said side portions stretching the hose over said central region and highly compressing the hose upon said side portions.

3. In an end fitting as in claim 1 wherein said means drawing said clamping plates toward each other comprises threaded fasteners interconnecting said clamping plates.

4. In an end fitting as in claim 1 wherein the lateral portions of said clamping plates extend in the longitudinal direction of the hose inserted nipple end a greater distance than the central clamping plate portions.

5. In an end fitting as in claim 1 wherein a hose end abutment shoulder is defined on said nipple, said shoulder being axially spaced from the end of the nipple received in the hose bore and defining a surface perpendicular to the longitudinal axis of the nipple.

6. In an end fitting as in claim 5 wherein a planar plate is mounted upon the outer end of said nipple parallel to a plane including the nipple edges, said plate having a planar surface defined thereon perpendicular to the axis of said central region and said nipple edges and intersecting said region and nipple edges defining said abutment shoulder, said clamping plates having portions engaging said planar plate.

References Cited in the file of this patent
UNITED STATES PATENTS

| | | |
|---|---|---|
| 1,072,896 | Albee | Sept. 9, 1913 |
| 1,494,164 | Goldbeck | May 13, 1924 |
| 2,594,639 | Gossett | Apr. 29, 1952 |
| 2,692,781 | Langille | Oct. 26, 1954 |
| 2,785,911 | Kaufman | Mar. 19, 1957 |
| 2,798,745 | Nelson | July 9, 1957 |